Patented Sept. 30, 1924.

1,510,196

UNITED STATES PATENT OFFICE.

ADOLF RÖMER, OF STUTTGART, GERMANY.

FERMENTATION PROCESS.

No Drawing.   Application filed April 9, 1921.  Serial No. 460,143.

*To all whom it may concern:*

Be it known that I, ADOLF RÖMER, a German subject and resident of Stuttgart, Germany, have invented certain new and useful Improvements in Fermentation Processes, (for which I have filed foreign applications as follows: Germany, filed Aug. 26, 1916, granted Sept. 20, 1921. Patent No. 340,904; Germany, filed Sept. 5, 1918, granted Feb. 4, 1922, Patent No. 348,285; Germany, filed Jan. 20, 1919, granted Dec. 30, 1921, Patent No. 346,460; Germany, filed Apr. 25, 1919, granted Feb. 4, 1922, Patent No. 348,286; England, filed June 17, 1920, accepted Apr. 21, 1921, Patent No. 161,870; France, filed Dec. 21, 1818, published June 16, 1921, Patent No. 519,815; France, filed July 9, 1920, Published Oct. 18, 1921, Patent No. 23248/519815; Belgium, filed July 8, 1920, granted Aug. 14, 1920, Patent No. 298,946; Canada, filed Dec. 4, 1920, granted Feb. 21, 1922, Patent No. 215,999; Denmark, filed July 17, 1820, granted Feb. 8, 1922, Patent No. 29,357; Norway, filed Dec. 27, 1917, granted Sept. 20, 1920, Patent No. 31,035; Norway, filed June 30, 1920, granted Jan. 2, 1923, Patent No. 36,423; Switzerland, filed Dec. 5, 1918, granted Dec. 1, 1920, Patent No. 81,614; Switzerland, filed July 7, 1920, granted Jan. 16, 1922, Patent No. 92,577; Hungary, filed July 23, 1917, granted July 10, 1918, Patent No. 72,292; Hungary, filed Aug. 25, 1920, patent of addition, number unknown; Finland, filed Aug. 6, 1920, granted Sept. 15, 1922, Patent No. 9,158; Holland, filed June 29, 1920, no patent granted; Austria, filed June 28, 1920, no patent granted; Poland, filed June 23, 1920, three applications, no patent granted; Sweden, filed Dec. 7, 1918, no patent granted; Sweden, filed June 30, 1920, no patent granted; Yugoslavia, filed Mar. 29, 1921, no patent granted; Yugoslavia, filed Dec. 10, 1921, no patent granted; Hungary, filed Mar. 25, 1921, no patent granted; Czechoslovakia, filed July 19, 1922, no patent granted; Czechoslovakia, filed July 7, 1920, no patent granted; Serb-Croat-Slovene State, filed Mar. 29, 1921, no patent granted; Serb-Croat-Slovene State, filed Dec. 10, 1921), of which the following is a specification.

The process according to this invention is carried out by passing for instance industrial sugar solutions through yeast filters arranged in closed vessels which are in communication with one another. The filter is formed in the known manner by suitably fixing the yeast for instance in diatomaceous earth (kieselguhr), saw-dust or the like. Yeast thus prepared (the so-called fixed ferment) is placed in each of the fermentation vessels. In order to avoid oxidation which would give rise to vinegar or other liquids containing acetic acid an admission of air must be avoided in performing the process according to this invention since the vinegar forming bacteria are present in the air at all times.

The invention may be carried out in practice by using for instance a set of six cylindrical vessels arranged one behind the other and communicating with each other by pipes so that the liquid to be fermented escapes at the top of each of the vessels and enters the adjacent one at the bottom. The connecting pipes are provided with cocks and are adapted to allow the vessels to be interchanged, that is to say, the first to be used in place of the sixth or second, the second in place of the first or third, and so forth.

The sugar solution to be fermented is caused to flow gradually through the set of vessels at a temperature of about 20° to 30° C. for instance, the flow being regulated so that the liquid leaving the last vessel is entirely fermented. Particular attention must be given to the regulation of the rate of flow of the liquid to be fermented and must be such as to suit the circumstances in each case. The direction of flow is altered at certain intervals of time, for example every 12 or 24 hours in order to ensure that the same yeast does not remain a long time in contact with liquid which is poor in sugar or is rich in sugar. When the fermentative power of the yeast falls off, each vessel may be taken out, supplied with a fresh charge of yeast and connected to the set again without interfering with the progress of the fermentation. The flow of the liquid may be caused for example by pressure or by suction.

Great advantages are derived from this process as regards plant and cost of running. In the fermentation of sulfite liquor for instance, less than one fiftieth of the space and a far smaller amount of heat are required than with the known processes. Moreover the entirely continuous and automatic progress of the operation allows of a great saving of labor and an accurate control over the process. Further, in the fermentation of for example sulfite liquor the life of the yeast is almost unlimited and contrary to views held hitherto, degeneration does not occur in spite of the small sugar contents of the solution. After a period of activity of eight months the yeast is still entirely pure and vigorous; so that its renewal and culture hardly come into consideration.

Industrial sugar solutions of any kind may thus be submitted to fermentation on a continuous process, such solutions being for instance molasses, saccharified substances containing starch and cellulose or starch or cellulose, or they may be sugar-containing plant extracts, more particularly those which contain fermentation retarding elements.

It has been found moreover that when the above-described method of employing fermentative bodies is applied to other fermentation agents, it is possible to carry out a continuous process which saves space, steam and labor, irrespective of the kind of ferment used, that is to say, whether it yields an alcoholic, acid or other fermentation product. This process may thus be successfully applied for example to the production by fermentation of butyl alcohol, glycerine, lactic acid, butyric acid, citric acid, acetone etc.

In all the above cases the ferment should be spread over a large area to allow free activity of the cells which is favourable to the growth of the ferment. Whatever kind of fermentation agent is used, the progress of fermentation is surprisingly smooth; care need only be taken that the temperature and rate of flow required by each particular ferment are correctly adhered to.

The process yields other quite appreciable advantages. It is common knowledge for instance that the concentration of acids in acid fermentation greatly impairs the activity of the operating bacteria, for which reason in known processes for the manufacture of lactic, butyric, and other acids, the acid is eliminated for instance by neutralizing with lime. This is unnecessary in the present process because in addition to the fermented acid liquid being immediately carried away, the path of flow may be regularly altered so that the fermentation agent is never in contact a long time with the detrimental substances produced by the fermentation.

Furthermore, experiments have shown that alcoholic fermentation of industrial solutions poor in sugar and also other fermentations need not be carried out in a plurality of intercommunicating vessels since with such solutions a periodical renewal of the yeast is not necessary. Consequently continuous fermentation may be successfully carried out by passing the sugar solution through a single closed vessel provided with the required fixed ferment the size of the said vessel being such that the liquid is entirely fermented when it leaves the vessel after a predetermined time. To that end cylindrical tubes for instance are suitably arranged vertically, inclined or horizontally. The direction of flow may also be altered in this arrangement.

I claim:

1. The method of fermenting non-potable sugar solutions which consists in subjecting the solution to the action of fixed yeast while flowing in a current over and through the same as such a rate as to allow contact with the yeast for a sufficient time to produce fermentation of the fermentable substances contained therein.

2. The method of fermenting fermentable solutions derived from cellulose which consists in subjecting the solution to the action of fixed yeast arranged in a vessel while flowing in a current over and through the same at such a rate as to allow contact with the yeast for a sufficient time to produce fermentation of the fermentable substances contained therein and reversing the direction of flow of the current of solution at intervals.

3. The method of fermenting industrial sugar solutions which consists in subjecting the solution to the action of fixed yeast arranged in discrete masses in a series of communicating vessels, while flowing in a current over and through the yeast at such a rate as to allow contact therewith for a sufficient time to produce fermentation of the fermentable substances contained therein, and excluding air during the process.

4. The method of fermenting industrial sugar solutions which consists in subjecting the solution to the action of fixed yeast arranged in discrete masses in a series of communicating vessels, while flowing in a current over and through the yeast at such a rate as to allow contact therewith for a sufficient time to produce fermentation of the fermentable substances contained therein, excluding air during the process and altering the order of succession of said vessels at intervals.

5. The method of fermenting fermentable solutions derived from cellulose which consists in subjecting the solution to the action of fixed yeast arranged in discrete masses in a vessel, while flowing in a current over and through the same at such a rate as to allow contact therewith for a sufficient time to produce fermentation of the fermentable substances contained therein.

6. The method of fermenting fermentable solutions derived from cellulose which consists in subjecting the solution to the action of fixed yeast arranged in discrete masses in a series of communicating vessels, while flowing in a current over and through the yeast at such a rate as to allow contact therewith for a sufficient time to produce fermentation of the fermentable substances contained therein, and excluding air during the process.

7. The method of fermenting fermentable solutions derived from cellulose which consists in subjecting the solution to the action of fixed yeast arranged in discrete masses in a plurality of vessels, while flowing in an upward current in each vessel over and through the yeast at such a rate as to allow contact therewith for a sufficient time to produce fermentation of the fermentable substances contained therein.

8. The method of fermenting waste sulfite liquor which consists in neutralizing the liquor, freeing it from sulphurous acid and subjecting the solution to the action of fixed yeast arranged in discrete masses in a vessel, while flowing in a current over and through the same at such a rate as to allow contact therewith for a sufficient time to produce fermentation of the fermentable substances contained therein.

9. The method of fermenting waste sulfite liquor which consists in neutralizing the liquor, freeing it from sulphurous acid and subjecting the solution to the action of fixed yeast arranged in discrete masses, in a series of communicating vessels while flowing in a current over and through the same at such a rate as to allow contact therewith for a sufficient time to produce fermentation of the fermentable substances contained therein, the order of succession of said vessels being altered at intervals.

10. The method of continuous fermentation of waste sulphite liquor which consists in passing the solution through a plurality of vessels connected in series, each vessel containing discrete masses of fixed yeast and continuing the flow at such a rate as to allow contact between the solution and the yeast for a sufficient time to produce fermentation of the fermentable substances contained in the solution.

In testimony whereof I have signed my name to this specification in the presence of two subscribing witnesses.

DR. ADOLF RÖMER.

Witnesses:
WILHELM RICHTER,
AUGUST FREY.